United States Patent
Kurnit et al.

(10) Patent No.: US 10,521,851 B2
(45) Date of Patent: Dec. 31, 2019

(54) MULTI-SITE ORDER FULFILLMENT WITH SINGLE GESTURE

(71) Applicant: Keep Holdings, Inc., New York, NY (US)

(72) Inventors: Scott Philip Kurnit, New York, NY (US); Charles Myslinsky, Brooklyn, NY (US); Ryan Quigley, Greenport, NY (US); Scott Craig Germaise, Stamford, CT (US)

(73) Assignee: KEEP HOLDINGS, INC., New York, NY (US)

( * ) Notice: Subject to any disclaimer, the term of this patent is extended or adjusted under 35 U.S.C. 154(b) by 803 days.

(21) Appl. No.: 14/852,274

(22) Filed: Sep. 11, 2015

(65) Prior Publication Data
US 2016/0189281 A1   Jun. 30, 2016

Related U.S. Application Data

(60) Provisional application No. 62/096,837, filed on Dec. 24, 2014.

(51) Int. Cl.
*G06Q 30/06* (2012.01)

(52) U.S. Cl.
CPC ..... *G06Q 30/0635* (2013.01); *G06Q 30/0609* (2013.01); *G06Q 30/0619* (2013.01); *G06Q 30/0633* (2013.01)

(58) Field of Classification Search
CPC ......... G06Q 30/06–0645; G06Q 30/08; G06Q 50/01
See application file for complete search history.

(56) References Cited

U.S. PATENT DOCUMENTS

| | | | |
|---|---|---|---|
| 7,305,355 B2* | 12/2007 | Tarvydas | G06Q 30/06 705/26.43 |
| 7,363,248 B2* | 4/2008 | Rollins | G06Q 20/02 705/14.65 |

(Continued)

OTHER PUBLICATIONS

Lee, "Selling and Fulfillment Solutions Using WebSphere Commerce and IBM Sterling Order Management," IBM International Technical Support Organization, IBM Redbooks, Jun. 2011, 268pp. (Year: 2011).*

(Continued)

*Primary Examiner* — Adam L Levine
(74) *Attorney, Agent, or Firm* — Fenwick & West LLP

(57) ABSTRACT

Disclosed is a system and method for fulfilling orders for multiple entities located on websites with distinct entity checkout systems with a single user input. The process for fulfilling orders for two entities includes receiving a first indication to purchase a first entity and a second indication to purchase a second entity, where the first entity is associated with a first retailer and the second entity is associated with a second retailer. The method also includes extracting information associated with the first and second entities from the respective web pages where the entities are available for purchase, and receiving a user input to initiate order fulfillment. The method further includes checking the availability of the entities at their respective retailers and providing alternate entities and/or retailers, if applicable. The method is completed by deploying fulfillment agents and purchase agents for completing the transactions.

20 Claims, 8 Drawing Sheets

(56) References Cited

U.S. PATENT DOCUMENTS

| | | | | |
|---|---|---|---|---|
| 10,121,176 B2* | 11/2018 | Buezas | .............. | G06Q 30/0615 |
| 2002/0052806 A1* | 5/2002 | Hodson | ................ | G06Q 30/06 |
| | | | | 705/26.8 |
| 2012/0310914 A1* | 12/2012 | Khan | ................ | G06F 17/30864 |
| | | | | 707/710 |
| 2017/0148046 A1* | 5/2017 | Akbarpour Mashadi | ................... | |
| | | | | G06Q 30/0239 |

OTHER PUBLICATIONS

Fasli, "Shopbots: A Syntactic Present, A Semantic Future," IEEE Internet Computing, vol. 10, Issue 6, Nov. 1, 2006, pp. 69-75. (Year: 2006).*

* cited by examiner

MULTI-SITE ORDER FULFILLMENT WITH SINGLE GESTURE

CROSS REFERENCE TO RELATED APPLICATION

This application claims the benefit of U.S. Provisional Application No. 62/096,837, filed Dec. 24, 2014, which is incorporated by reference in its entirety.

BACKGROUND

Field of Art

The disclosure generally relates to the field of electronic transactions.

Description of Art

Electronic commerce (e-commerce) enables trading in entities (e.g., products or services) using computer networks, such as the Internet. Users are able to purchase entities on e-commerce websites provisioned by e-commerce retailers. Users typically use generic or shopping specific search engines to identify various entities of interest to them. Upon finding an entity of interest located at a website of a retailer, a user purchases the entity of interest by performing an e-commerce transaction at the retailer's website.

In an example scenario where the user is interested in two or more entities that are located on two or more web sites with different and distinct entity checkout systems, the user purchases each of the multiple entities on each web site that includes the particular entity of interest by performing separate transactions. For example, to purchase two entities on two web sites with distinct entity checkout systems such as MACYS website and JCREW website, the user has to purchase the first entity on MACYS' website and the second entity on JCREW's website as two separate transactions. Additionally, conventional methods do not provide alternate entities and/or alternate retailers to the user outside of using a singular checkout system.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
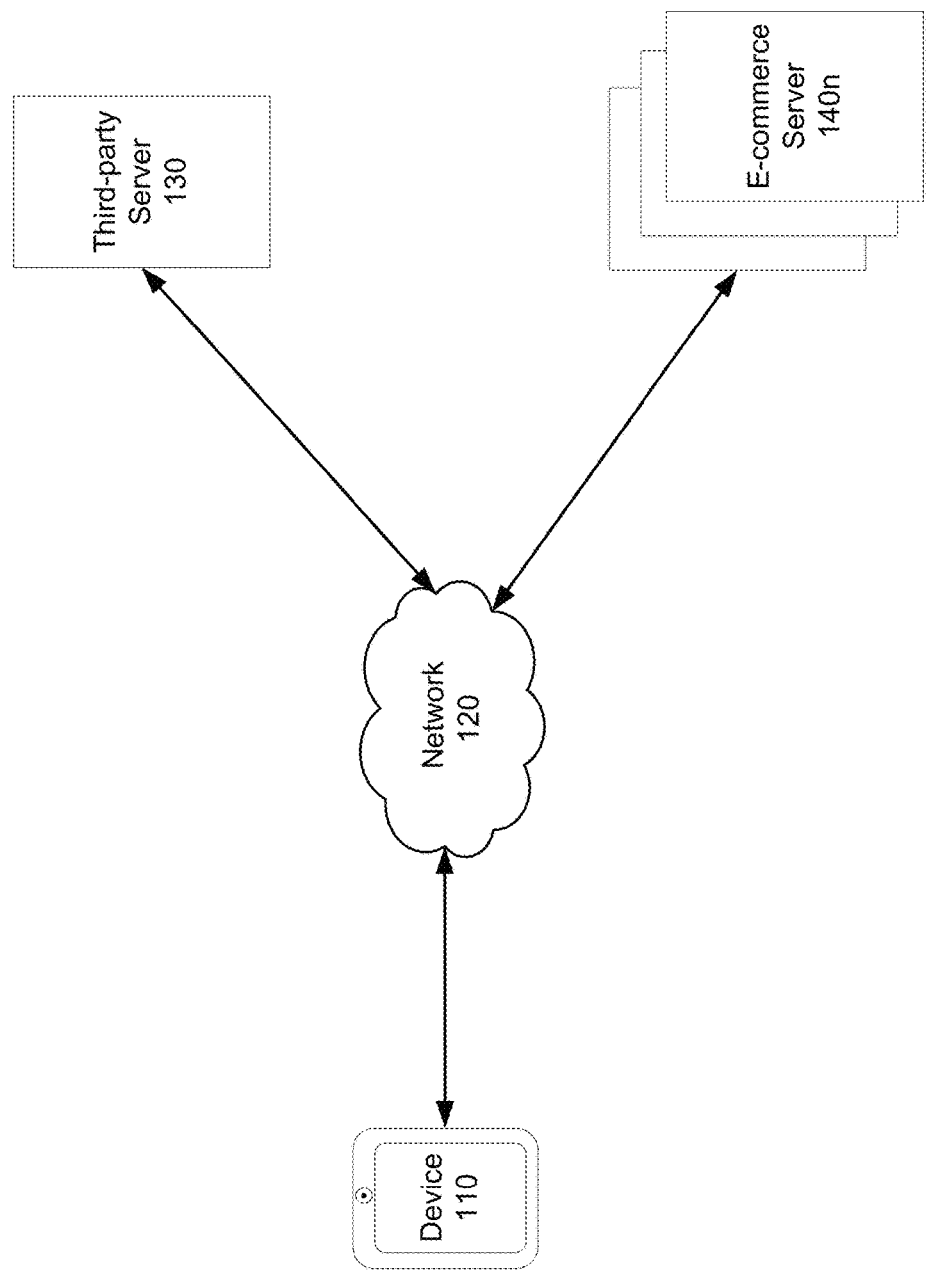
FIG. 1 illustrates a block diagram of an example system environment implementing a single gesture order fulfillment system, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an application for fulfilling multiple electronic commerce (e-commerce) orders to purchase multiple products or services (i.e., e-commerce entities) located on distinct web domains using a single gesture input. The application may be implemented as a system, method and/or a computer program product (e.g., a computer readable storage medium that stores instructions executable by one or more processing units).

In an example scenario, a user, through a user account, visits various e-commerce web pages of various shopping websites through an application on a mobile device such that the user may save all interested entities in a repository within the application for later purchase. An entity as described herein represents a product or service that may be purchased over an e-commerce web page. A server hosting the application, for example, initiates a method to fulfill orders for purchasing the saved entities in response to receiving a single gesture input from the user. The example method for fulfilling two entities located on two distinct web sites includes receiving a first indication to purchase the first entity and a second indication to purchase the second entity, where the first entity is associated with a first retailer and the second entity is associated with a second retailer, where the second retailer has a different and distinct entity checkout system compared with that of the first retailer.

The method then includes extracting information associated with the first and second entities from the respective web pages where the entities are available for purchase, where the extracted information includes a visual map representation of the web pages. The visual map representation is a local copy of the web page that includes the entity of interest, where the visual map representation includes various attributes of the entity such as entity pricing and availability. The generated visual map representation for each entity of interest is saved in a repository associated with an account of the user for future use.

A user provides a single input such as a gestural input to initiate order fulfillment for the multiple orders saved in the user's repository. The order fulfillment begins with checking the availability of the entities at their respective retailers. For the entities that are unavailable at a retailer, the method may include providing alternatives to the user such as providing either alternate entities at the same retailer and/or providing alternate retailers for the same entity. The process of providing alternatives to the user can be either fully automated without human intervention or may include human intervention. The process may include checking whether any of the retailers are part of a retailer black list and if so, provide alternate retailers and/or entities as a remedy.

After verifying that the entities are available at respective retailers and/or providing alternate entities that are available at the retailers, the order fulfillment process continues with deploying fulfillment agents and determining fulfillment methods. The fulfillment methods may relate to one or more of store promotions, shipping, taxes, membership, payment methods, and any other special needs. After determining the various fulfillment methods for the orders, the process continues by deploying purchase agents (with or without human intervention) to complete the order fulfillment for purchasing the entities. The process may also include completing payment transactions for the orders as part of the order fulfillment system.

Example advantages of the method include fulfilling of multiple orders for purchasing entities located on web sites with distinct entity checkout systems with a single gestural input; fulfilling the payment for each order of the multiple orders without user involvement, where the user only provide a one-time payment to the third-party that is managing the multi-order fulfillment and the third-party completes the individual payments for each order being fulfilled; and providing alternate entities/retailers when an entity is not available at a retailer or when a retailer is in a black list.
Example System Environment FIG. 1 illustrates a block diagram of an example system environment 100 implementing a single gesture order fulfillment for electronic commerce ("e-commerce") transactions. System 100 includes an electronic device 110, a third-party server 130, a plurality of e-commerce servers 140*a-n*, and a network 120 used for communication between the device 110 and the servers (i.e., third-party server 130 and e-commerce servers 140*a-n*). In one embodiment, each of the e-commerce servers 140*a-n* hosts an e-commerce website (including various e-commerce web pages) that include entities for purchase, and third-party server 130 hosts an application associated with a third-party (hereinafter "third-party application") that runs on the device 110 and may save a user's interested entities in a user's wish list such as a repository associated with an account of the user or a shopping cart.

In an example scenario, the user of the device 110 first invokes the third-party application on the device 110 to execute the application on the device 110. The application allows the user to access e-commerce websites to perform e-commerce transactions from within the application's user interface using an account of the user. The user accesses two or more e-commerce websites, and wishes to save two or more entities at a repository associated with the user (e.g., a repository associated with an account of the user) and maintained by the third-party. In one embodiment, the user accesses two distinct domains for purchasing entities such that the third-party server 130 can extract the necessary information from each distinct domain that the user purchases entities from to complete all transactions with a single gesture.

An entity as described herein represents a product or service that may be purchased over an e-commerce web page. In one embodiment, the entity represents a product with physical manifestation and is configurable in various attributes of the product. Example configurable attributes include size, color, size type, size system, age group, gender, and product category. Alternatively, the entity represents a product without physical manifestation, a product downloadable from a network, a product representing a subscription service, or a product representing a digital gift. An entity may also represent a group of products (or services) such that pricing information of the group of products (or services) represents a bundled price for the group of products (or services).

The device 110 is an electronic device, such as cell phone, smart phone, desktop phone with or without a display, audio and/or video conferencing device, tablet, phablet, computer, gaming console, gaming controller, or any device that has a capability to access e-commerce websites, to provide for display information from the websites, and to enable a user to perform e-commerce transactions using an account associated with the user. The device 110 includes, among other components, a processor to execute instructions and a memory module to store data. The memory module of the device 110 stores data while the device is being used for transactions on e-commerce websites. The memory module may include high-speed random access memory and/or non-volatile memory, such as one or more magnetic disk storage devices, one or more optical storage devices, and/or flash memory (e.g., NAND, NOR). The memory module may store an operating system such as Darwin™, RTXC™, LINUX™, UNIX™, OS X™, WINDOWS™, ANDROID, or an embedded operating system such as VxWorks™. The operating system may include instructions for handling basic system services and for performing hardware dependent tasks. In some implementations, the operating system may be a kernel (e.g., UNIX™ kernel). The memory module may also store communication instructions to facilitate communicating with one or more additional devices, one or more computers and/or one or more servers (e.g., third-party server 130 and e-commerce servers 140*a-n*). More exemplary details of components of a device 110 (also referenced as a machine) are provided below with respect to FIG. 7 and its corresponding description.

Network 120 allows the device 110 to interact with third-party server 130 and e-commerce servers 140*a-n*. In an example embodiment, the network 120 uses standard communications technologies and/or protocols. Thus, network 120 may include links using technologies such as Ethernet, 802.11 standards, worldwide interoperability for microwave access (WiMAX), WiFi, 3G, digital subscriber line (DSL), etc. The data exchanged over the network 120 may be represented using technologies and/or formats including the hypertext markup language (HTML), the extensible markup language (XML), etc.

Third-party server 130 is coupled to the device 110 via the network 120 for communicating with the device 110 while the user is operating the third-party application. In one embodiment, the third-party server 130 operates in a client-server architecture, where the third-party server 130 serves client devices, such as device 110, based on any requests received from the client devices. Some of the functions that third-party server 130 may perform include receiving, hosting, storing, and providing data associated with the user of the client devices. For example, the third-party server 130 may be an application server. The third-party server 130 comprises multiple components similar to the components of the example machine described below in detail with reference to FIG. 7.

Each of the e-commerce servers 140*a-n* is coupled to the device 110 and the third-party server 130 via the network 120 for facilitating access to any e-commerce website that the user uses to perform e-commerce transactions. In one embodiment, the user accesses the e-commerce websites from within the third-party application. Alternatively, the user accesses the e-commerce website from outside of the third-party application. In one embodiment, the e-commerce servers 140*a*-*n* operate in a client-server architecture, where each e-commerce server serves client devices, such as device 110, by providing web pages using hypertext transfer protocol based on any requests received from the client devices. The web pages can be provided such that the data presented on a web page can also be provided for display within a mobile application (without necessarily needing a web browser) executing on a device such as, for example, a smartphone, a tablet, and the like. Some of the functions that the e-commerce server may perform include receiving, hosting, storing, and providing data associated with the e-commerce websites used in the e-commerce transactions. For example, the e-commerce server may be a web server.

Example Single Gesture Order Fulfillment Overview

Figure 2:
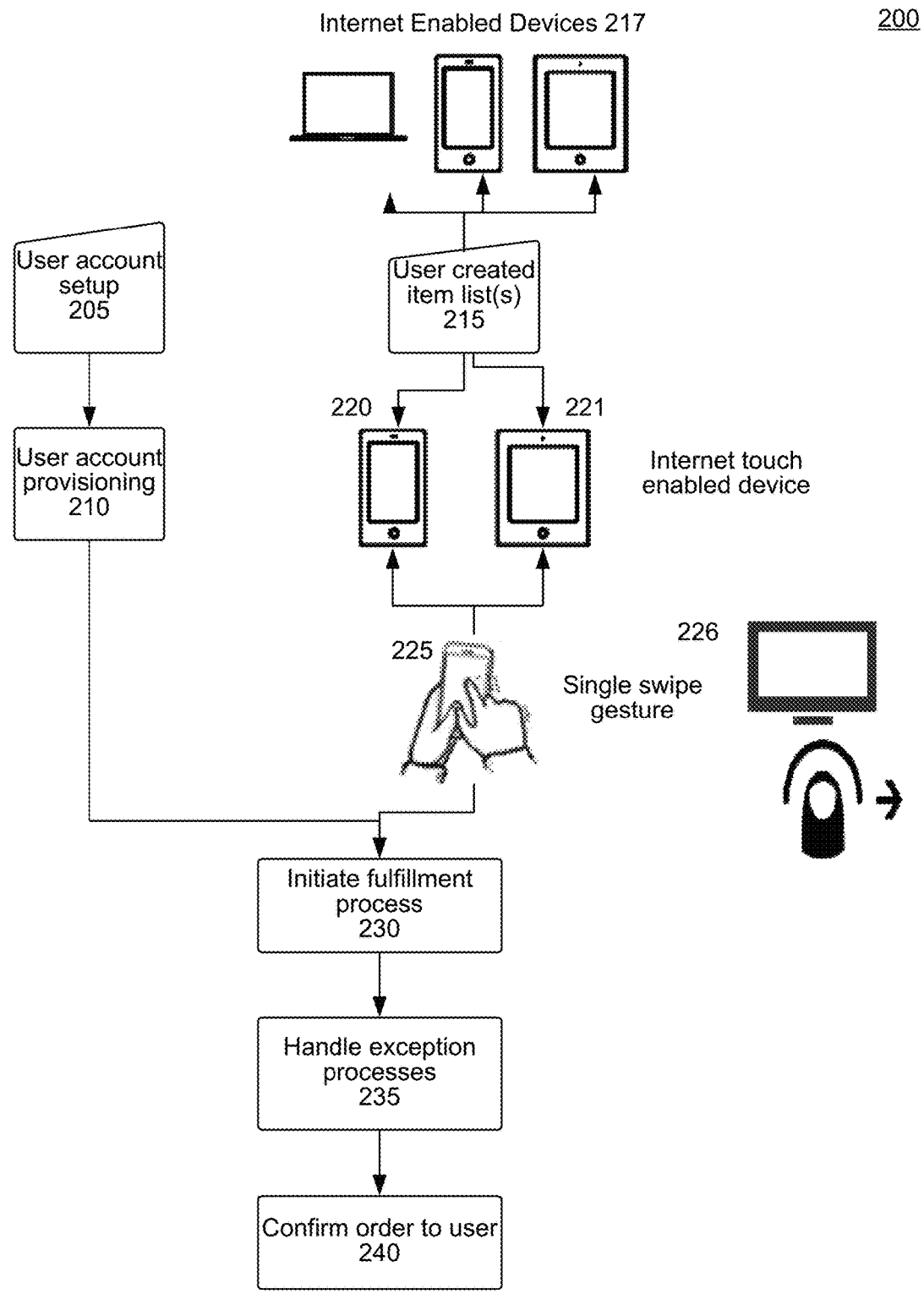
FIG. 2 is a flowchart of an example high-level process for an order fulfillment, according to one embodiment.

FIG. 2 is a flowchart of an example process 200 for a single gesture based order fulfillment, according to one embodiment. In an example scenario, a user of a device (e.g., device 110) accesses two or more e-commerce web pages associated with two or more e-commerce websites to purchase two or more entities through a third-party application running on the device. The user has an account with the third-party that the user might have created. The user may sign-in to the user's account before accessing the e-commerce website such that the third-party application may communicate with the two or more e-commerce websites while the user is performing transactions. Each of the tasks detailed in the example processes of FIGS. 2-6 may be implemented by one or more components of a server such as the third-party server 130.

The user may use an Internet enabled device 217 such as a desktop computer, laptop computer, tablet, smart phone and the like to create 205 one or more user accounts, which may be provisioned 210 by the system such that each user account profile has a personalized user repository in a database. The user repository may include a shopping wish list or shopping cart for all the entities the user is interested in purchasing, and may be created 215 at a time of adding the entities to the repository or at a time later than the time of adding the entities to the repository. In one embodiment, the user may add a first entity to be purchased to the repository from a first device and a second entity to be purchased to the repository from a second device, where the second device is different from the first device, and each of the first and second devices is either a mobile device or a desktop-based device. After adding all entities that the user is interested to purchase, the user may (at the time of adding the entities to the repository or at a later time) provide a gesture input to initiate an order fulfillment process for purchasing the entities. For example, the user may use devices such as handsets 220 and tablets 221 that have an ability to receive a gestural input 225 across the device interface to initiate a fulfillment process. In one embodiment, a gestural swipe can be implemented in the air without physically touching the device itself. For example, the gestural swipe can be implemented using a proximity sensor or a motion sensing input device can be used to control the display of a device such as an interactive television 226 that interprets such a gesture. An example gestural swipe is a single sweep gesture.

The single swipe gesture initiates 230 a fulfillment process for purchasing the two or more entities saved in the user's repository. In one embodiment, the server handles 235 any exception that might be encountered while fulfilling the orders of the two or more entities. For example, if an entity is not available at a retailer of choice of the user, the server may search for other retailers that offer the same entity for sale. Alternatively, the server may search to find other entities that are similar enough to the entity of interest. Other example exceptions may relate to the entity pricing that might not meet the pricing preferences of the user, shipping method of the entity that might not meet the user's preferences, and the like. The server handles the one or more exceptions in order fulfillment by communicating to the user any issues with their order and subsequently providing alternate options to the user when applicable. For example, when the entity of interest is not available at the preferred retailer, the server provides an alternate retailer to the user where the entity of interest is available. Other example alternate option may relate to the entity pricing that might not meet the pricing preferences of the user, shipping method of the entity that might not meet the user's preferences, and the like. The user may provide an input in response to the alternate options by selecting one of the alternate options, or indicate to the server to purchase the entity of interest from an alternate retailer by default by providing the user's preferences during (or before) adding the entities of interest to the user's repository. The server then provides a notification 240 to the user to indicate that the user's order to purchase two or more entities has been completed. The example process of the user adding two or more entities for purchase is described further below with reference to FIG. 3 and the example process of fulfilling orders in response to the user's gesture is detailed further with reference to FIGS. 4 through 6.

Example Process for Single Gesture Based Order Fulfillment

Figure 3:
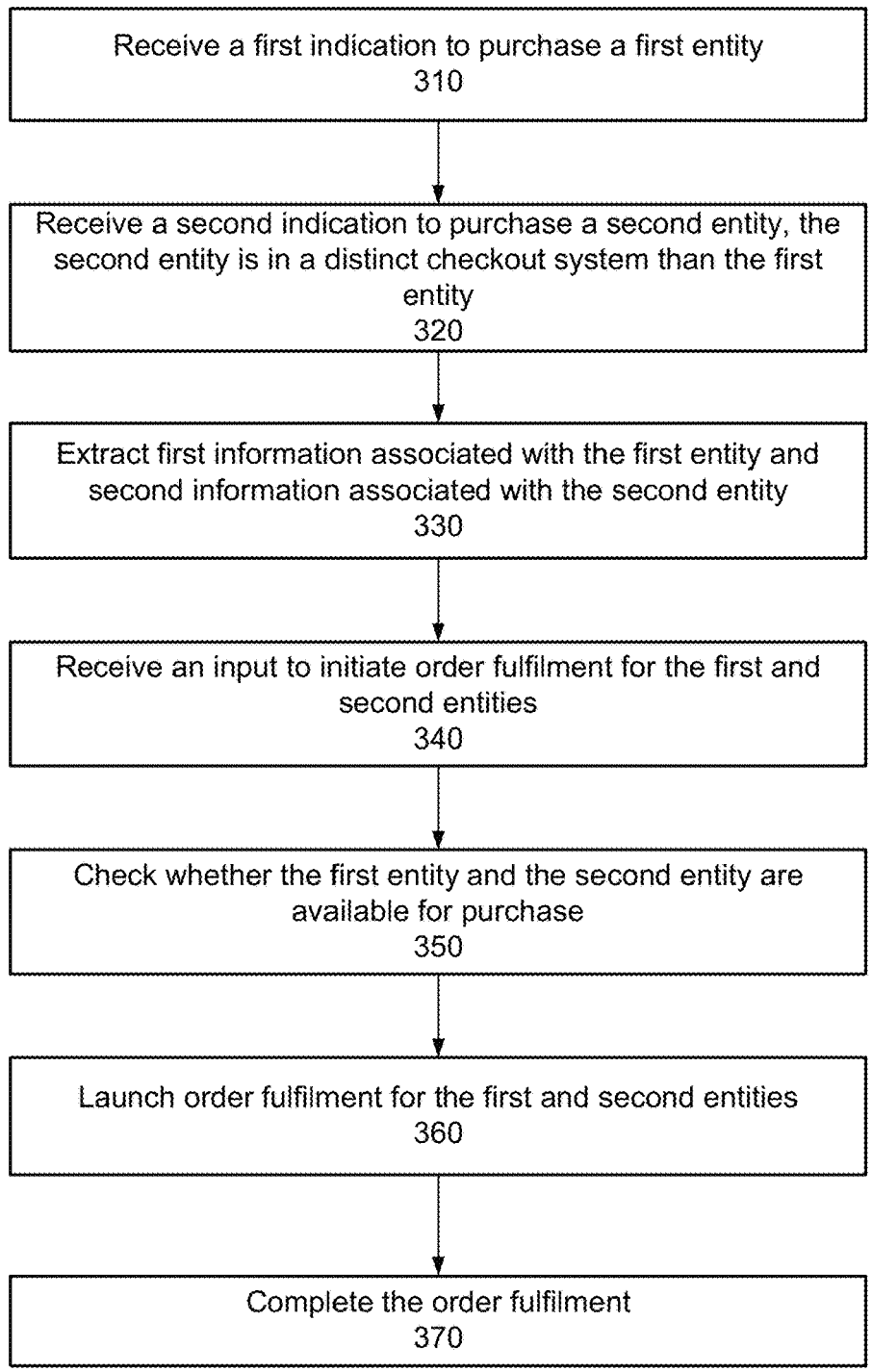
FIG. 3 is a flowchart of an example process for a single gesture based order fulfillment, according to one embodiment.

FIG. 3 is a flowchart of an example process 300 for a single gesture based order fulfillment, according to one embodiment. The process 300 may be executed on a server such as third-party server 130 described in FIG. 1. In an example scenario, a user of a device (e.g., device 110) accesses an e-commerce web page of an e-commerce website to purchase an entity through a third-party application running on the device. The user has an account with the third-party that the user might have created while registering for their service as described above with reference to FIG. 2. The user may sign-in to the user's account before accessing the e-commerce website such that the third-party application may communicate with the e-commerce website while the user is performing transactions. In one embodiment, the user may be interested in purchasing two different entities, where each of the two entities is associated with a different and distinct website domain. For example, each of the two websites with which each of the two entities are associated with may have a distinct entity checkout system for purchasing an entity such as a retail organization system. Example retail organization system may be the JCREW system and the MACYS system. Another example websites with different checkout systems include the AMAZON website and ZAPPOS website. Alternatively, the user may be interested in purchasing more than two different entities, where the entities may be associated with more than two different and distinct website domains. While this example embodiment describes order fulfillment for two entities, this disclosure is not limited to two entities and can be extended to any number of entities.

While performing transactions on e-commerce web pages (e.g., purchasing two or more entities), the user saves information associated with the two or more entities at a repository associated with the user's account and maintained by the third-party. For example, when the user identifies an entity of interest on a web page, the user might wish to save the entity's information for future purchase as opposed to buying it immediately. In such scenario, the user may save the entity's information at the user's repository (i.e., a repository associated with an account of the user) maintained by the third-party. The web page including the entity of interest may also contain other entities that the user might or might not be interested in. The saved entity information includes at least an identifier of the entity's web page. For example, the entity's web page identifier is a universal resource identifier (URI). An URI is a string of characters used to identify a name or a resource on the Internet. A URI identifies a resource either by a location such as universal resource locator (URL), or a name such as universal resource identifier (URI), or both. A URL is a subset of the URI that specifies where an identified resource (e.g., entity's web page) is available and the mechanism for retrieving the web page. That is, a URL defines how the web page may be accessed. While URLs most commonly are used to refer to web pages (e.g., http), URLs may also be used for file transfer (e.g., ftp), email (e.g., mailto), database access (e.g., JDBC), and other applications. A URN is a URI that uses the URN scheme, and does not imply availability of the identified resource. The user's repository is hosted and maintained by a server of the third-party (e.g., third-party server 130). Each of the tasks detailed in the example process of FIGS. 3-6 are implemented by one or more components of the server 130.

The server receives 310 a first indication to purchase a first entity, where the first entity is offered for purchase at a first e-commerce web page from an electronic device (e.g., device 110) associated with the user. For example, the device is a mobile device used by the user. In one embodiment, the first indication to purchase the first entity is represented by the user adding (and saving) the first entity to the user's repository. The first web page is associated with a first retailer.

The server receives 320 a second indication to purchase a second entity, where the second entity is offered for purchase at a second e-commerce web page from the user's device. The second e-commerce web page is different from the first web page and has a different entity checkout system than that of the first web page. For example, web pages associated with AMAZON and ZAPPOS websites have different entity checkout systems. In one embodiment, the second indication to purchase the second entity is represented by the user adding (and saving) the second entity to the user's repository. The second web page is associated with a second retailer. In one embodiment, a party managing the order fulfillment process (e.g., organization associated with the third-party server 130) does not have an apriori relationship with either of the first retailer or the second retailer.

After the two or more entities are saved to the user's repository, the server extracts 330 information associated with the entities to add to a shopping cart associated with the user. For example, when the fulfilled orders include two entities, the server extracts first information associated with the first entity from the first web page and second information associated with the second entity from the second web page, the first and second information added to a shopping cart associated with the user. In some embodiments, the server accesses the web pages associated with the two or more entities that were saved within the user's repository to retrieve information associated with the saved entities. The server retrieves a URI of the entity from the user's repository to identify and locate the web page of the entity. For example, the server retrieves the URL of the web page associated with the saved entity from the repository and accesses the web page. The server may access the web page either automatically or in response to the user's request. In one embodiment, the user places a request to initiate a purchase of the entity saved in the user's repository (e.g., user selects, clicks or touches (on a touch sensitive display)) 'buy' button). Upon receiving such request, the server retrieves the URL of the web page to access the web page. Alternatively, the server may retrieve the URL to access the web page periodically based on either the user's settings or other means without the user having to place any request to initiate the purchase. By periodically accessing the web page, the server may update information associated with the entity (e.g., pricing and/or availability information of the entity) on a regular basis to provide accurate information to the user. In one embodiment, the server deploys a web crawler to access the web page and extract entity information.

In one embodiment, after accessing the entity's web page, the server generates a visual map representation of the web page. In one embodiment, the server creates the visual map representation for each of the two or more entities. The visual map representation is used for extracting relevant information of the entity. The visual map representation includes one or more elements of the web page, where each element represents relevant information such as pricing information, availability information, or some other information of the entity. The visual map captures the relative positions of the elements of the web page. Each element of the web page may include stylistic identifiers for the relevant information of the entity. For example, stylistic identifiers for pricing include price labels. An example process of adding multiple entities to a user's repository or a shopping cart including extracting necessary entity information is described below in further detail with reference to FIG. 4.

Example Process for Adding Multiple Entities to Shopping Cart

Figure 4:
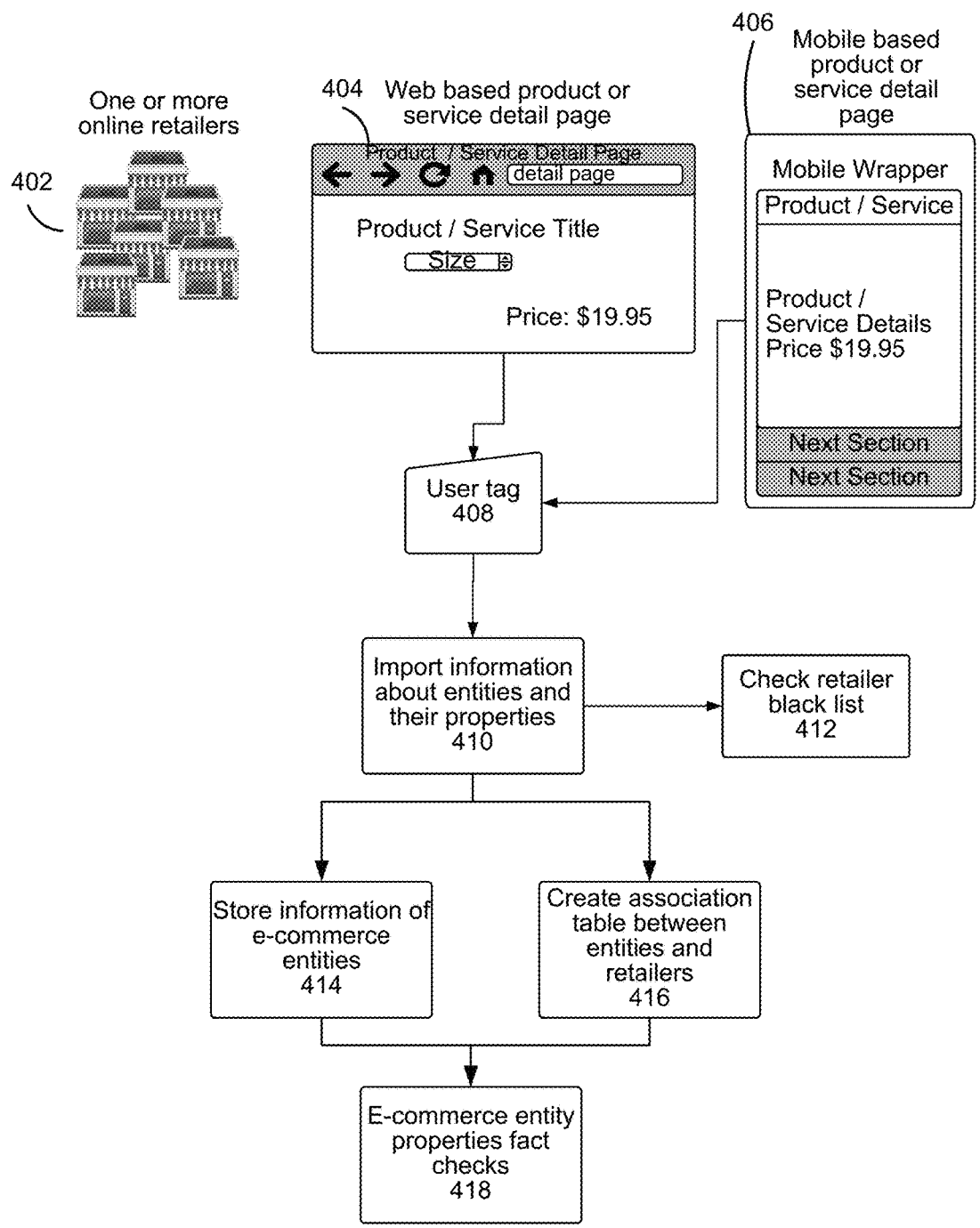
FIG. 4 is a flowchart of an example process for adding multiple entities to a shopping cart, according to one embodiment.

FIG. 4 is a flowchart of an example process 400 for adding items originated from multiple unassociated entities to a singular shopping cart, according to one example embodiment. The process begins with the user accessing multiple web pages that include multiple entities that the user is interested to purchase. For example, the user accesses web pages associated with one or more online retailers 402, where each online retailer has one or more entities (e.g., up to hundreds or even hundreds of thousands) for sale, rental or other licensing arrangements. The entities may be offered for purchase via online web pages that are presented optimally for desktop-based web browser software 404, mobile devices 406 that are typically referred to as handsets or tablets, and the like. It is understood that the entity offerings are not necessarily limited to the listed devices only and that other similar devices and platforms are also within the scope of the disclosure.

When the user is interested to purchase an entity while accessing the web pages, the user may provide an indication to the server that the user is interested in purchasing the entity. For example, the user may tag 408 such items either from a desktop-based computer or a mobile device using a bookmarklet or a browser plug-in, browser extension, app extension or a browser plug-in, or other means by which a user may indicate an entity. After receiving an indication that the user is interested in purchasing one or more entities, the server may store information associated with the one or more entities in a repository associated with the user. The server imports 410 information associated with the entities including various properties of the entities.

The importing process for each entity begins with the server fetching the web page. The fetched web page includes one or more entities for sale (e.g., user's entity of interest saved in the repository) and is used to generate a visual map representation of the web page. After fetching the web page, the server uses the source code of the web page to generate the visual map representation. In one embodiment, the server executes source code associated with the elements of the web page. For example, the server executes JavaScript code for all elements of the web page if JavaScript language is used for generating such elements. After executing the code for the elements of the web page, the server eliminates unnecessary information from the web page to generate the visual map representation. This includes, for example, deleting code associated with various headers, social links, advertisements, and the like.

The server generates a coordinate grid for the visual map representation. In one embodiment, the coordinate grid includes a horizontal axis and a vertical axis in a Cartesian coordinate system to be able to represent each element as a unique position on the grid. For example, a position of an element of the web page may be represented with horizontal axis (e.g., X-axis) and vertical axis (e.g., Y-axis) coordinates. The server applies stylistic heuristic identifiers to each of the elements of the web page based on the stylistic identifiers of the elements on the web page. Stylistic heuristic identifiers may relate to entity's properties such as pricing or availability of the entity. Example stylistic pricing identifiers may relate to price labels and availability identifiers.

The visual map representation is a local copy of the web page that comprises a subset of the elements of the web page, where the subset elements are relevant to entity properties such as entity pricing/availability. For each entity that the user expresses interest in (e.g., by providing an input to save the entity for future use), a visual map representation of the web page associated with the entity of interest is generated by including any elements of the web page that are relevant to entity properties such as pricing and/or availability. The generated visual map representation is saved in a repository associated with an account of the user for future use. One advantage of the generating and saving the visual map representation in a user's repository is that the user can simply refer to her repository to verify pricing/availability information of the entity instead of having to remember an address for accessing the web page that includes the entity of interest.

The server checks 412 whether a retailer associated with any of the entities tagged by the user is part of a retailer black list to determine the validity of the retailer. In one embodiment, the determination whether the retailer is part of a black list includes evaluating multiple attributes of the retailer. For example, the multiple attributes of the retailer include at least one or more of: popularity of the retailer, quality of merchandise sold by the retailer, location associated with the retailer, domain name of the retailer, media content associated with a web page of the retailer, reviews of the retailer, type of currency used for entity pricing information, shipping policy, return policy, and availability of customer support options. Alternatively, the determination whether the retailer is part of a black list is based on matching the retailer web domain name with certain heuristics such as a name-based wildcard list. For example, if the retailer domain name includes certain phrases such as "sextoys," such a retailer is determined to be part of a black list. Upon determining that a retailer is part of a black list, the server, in one embodiment, provides a notification to the user indicating that the retailer is blacklisted and provides an alternative retailer to the blacklisted retailer, where the alternative retailer is not blacklisted and has an ability to provide the entity associated with the blacklisted retailer.

Upon determining that the retailer is not part of a black list (i.e., a valid retailer for the transaction), the server stores 414 information imported by the server, where the information is associated with the e-commerce entities tagged by the user. In one embodiment, the importing 410 task may be implemented after the server checks the validity 412 of the retailer. After importing the entity information, the server may create 416 an association table between these entities and retailers where the entities can be purchased from. The association table can later be used for analyzing the orders for purchasing the entities as described below with reference to FIG. 5. The server then can perform various fact checking 418 on the metadata associated with each entity of the one or more entities. In one embodiment, the metadata fact checking 418 is performed to affirm entity information such as size, pricing, and availability is up-to-date.

Referring back to FIG. 3, the server receives 340 an input to initiate order fulfillment for the first and second entities. In one embodiment, the server receives the input from the user's device such as handsets and tablets that have an ability to receive a gestural input across the device interface to initiate a fulfillment process. For example, the received input is a single gesture input (e.g., swiping or clicking buy button) or a single voice command (e.g., the user uttering "buy") to initiate order fulfillment for the two or more entities to be purchased. After receiving the input to initiate the order fulfillment process, the server initiates the order fulfillment process that includes checking whether the entities are available at the respective retailers, and completing the order fulfillment process. An example process for order verification is described below in further detail with reference to FIG. 5.

Example Process for Order Verification

Figure 5:
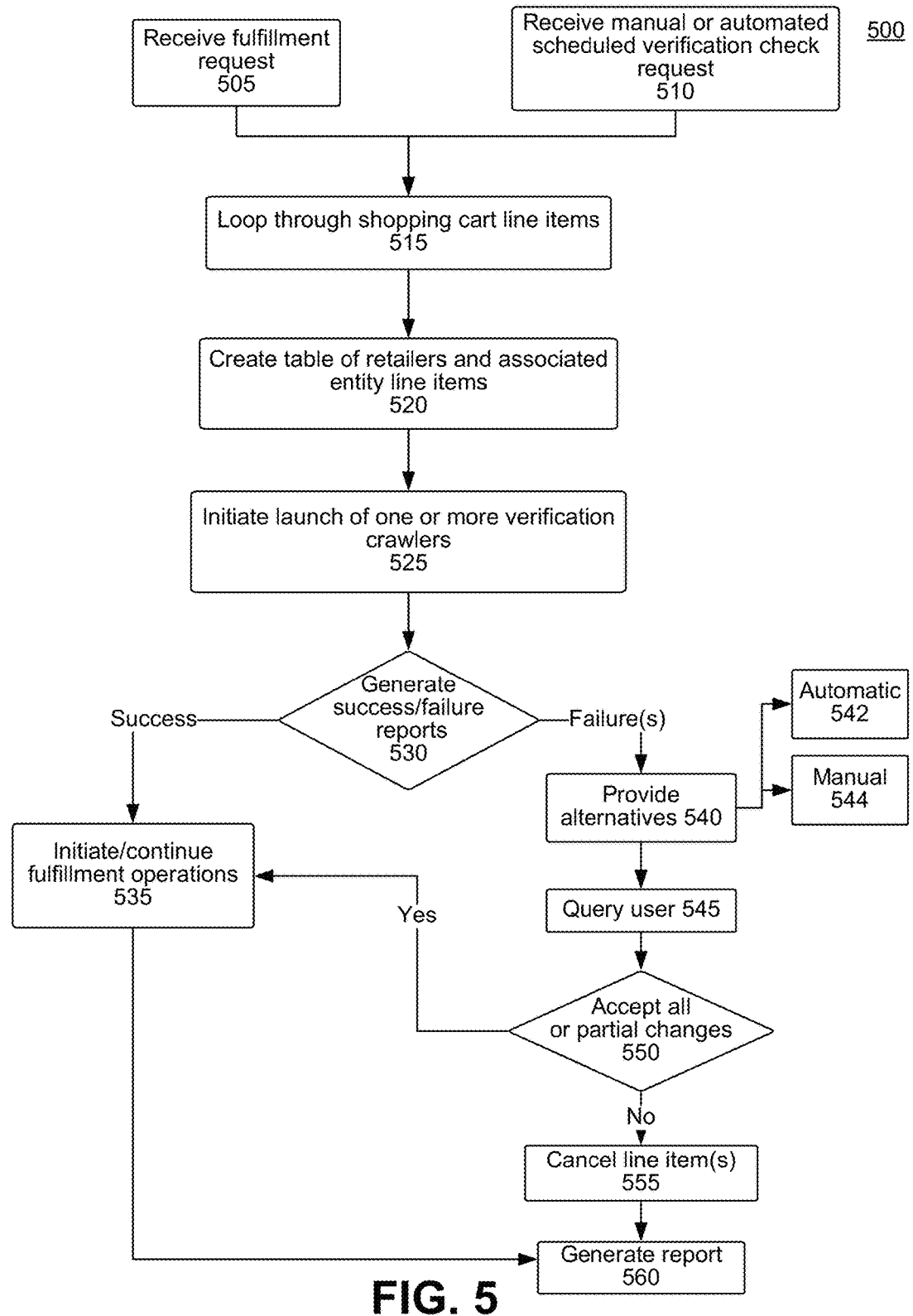
FIG. 5 is a flowchart of an example process for order verification, according to one embodiment.

FIG. 5 is a flowchart of an example process 500 for order verification, according to one embodiment. The order verification is configured to operate with orders from disparate online platforms. The order verification process begins after the server (e.g., third-party server 130) receives 505 a request to initiate order fulfillment. In one embodiment, the order verification process begins after the server receives 510 a manual or automated scheduled verification check request. For example, the user's preferences might be set such that the server would check periodically (either in response to the user's manual request or automatically without a manual input) the availability of orders. The server loops through 515 the line items associated with the orders in the shopping cart to create 520 a table of retailers and entity items associated with each retailer. For example, if there are four orders in the shopping cart, where three of the orders are associated with a first retailer and the fourth order is associated with a second retailer, the created table separates the orders per their retailer such that the three orders associated with the first retailer are grouped together and the fourth order associated with the second retailer is listed separately. After creating the table, the server launches 525 one or more verification crawlers to verify the availability of entities involved in the orders of the shopping cart. In one embodiment, a crawler is a web crawler such as an Internet bot that can systematically browse the Internet for purposes such as Web indexing, validating hyperlinks, and web scraping for extracting information from websites.

The server then generates 530 success/failure reports representing the availability status of the orders in response to the launching one or more verification crawlers. If the generated report indicates that all orders are available at their respective retailers within the parameters specified by the user, the server proceeds to initiate/continue 535 order fulfillment operations for the orders. The order fulfillment is described below in detail with reference to FIG. 6. If the generated report indicates, on the other hand, that at least one of the orders is not successful in terms of entity availability (i.e., one or more entities is unavailable at its respective retailer), the server provides 540 alternatives to the entities that are not available. In one embodiment, the server provides a recommendation to the user to purchase an alternate entity instead of the unavailable entity, where the alternate entity is available for purchase at one of the retailers associated with the orders to be fulfilled. For example, when the server is fulfilling a first entity and a second entity, and upon determining that the first entity is unavailable for purchase at the first retailer or that the second entity is unavailable for purchase at the second retailer, the server provides a recommendation to purchase a third entity as an alternate to the unavailable entity, where the third entity is available for purchase at either the first retailer or the second retailer.

Alternatively, the server provides a recommendation to the user to purchase the entity at an alternate retailer. For example, when the server determines that the first entity is unavailable for purchase at the first retailer or that the second entity is unavailable for purchase at the second retailer, the server provides a recommendation for purchasing the unavailable first entity or the unavailable second entity at an alternate retailer, where the first entity or the second entity is available for purchase at the alternate retailer. The task of providing alternatives when one or more entities is unavailable may either be fully automated 542 (i.e., without manual intervention) or may include manual intervention 544. In one embodiment with manual intervention, the user may be queried 545 to provide an input to select one of the provided alternatives to replace the unavailable one or more entities. In response to the query, if the user accepts 550 at least one of the provided alternatives, the server continues 535 (or initiates) order fulfillment operations for those orders after modifying the order line items with the user's accepted alternatives. If the user does not accept any of the provided alternatives, the server cancels 555 those line items that are associated with the unavailable one or more entities. The server may then continue with fulfilling the orders of the remaining line items after either modifying the orders and/or cancelling some of the line items.

In one embodiment, the server generates a response code indicating the availability status for the entity, and launches order fulfillment for each of the entities associated with the orders being fulfilled that includes launching code, where the launching code is based on the generated response code indicating the availability of the entity. The server may generate 560 a report providing status of the orders to be fulfilled. In one embodiment, the order status report may be generated and updated periodically to provide updated status of the orders. Alternatively, the order status report may be generated at the end of the order fulfillment that is described below with reference to FIG. 6.

Referring back to FIG. 3 and after checking entity availability, the server launches 360 order fulfillment for the first and second entities. An example process for order fulfillment is described below in further detail with reference to FIG. 6.

Example Process for Order Fulfillment

Figure 6:
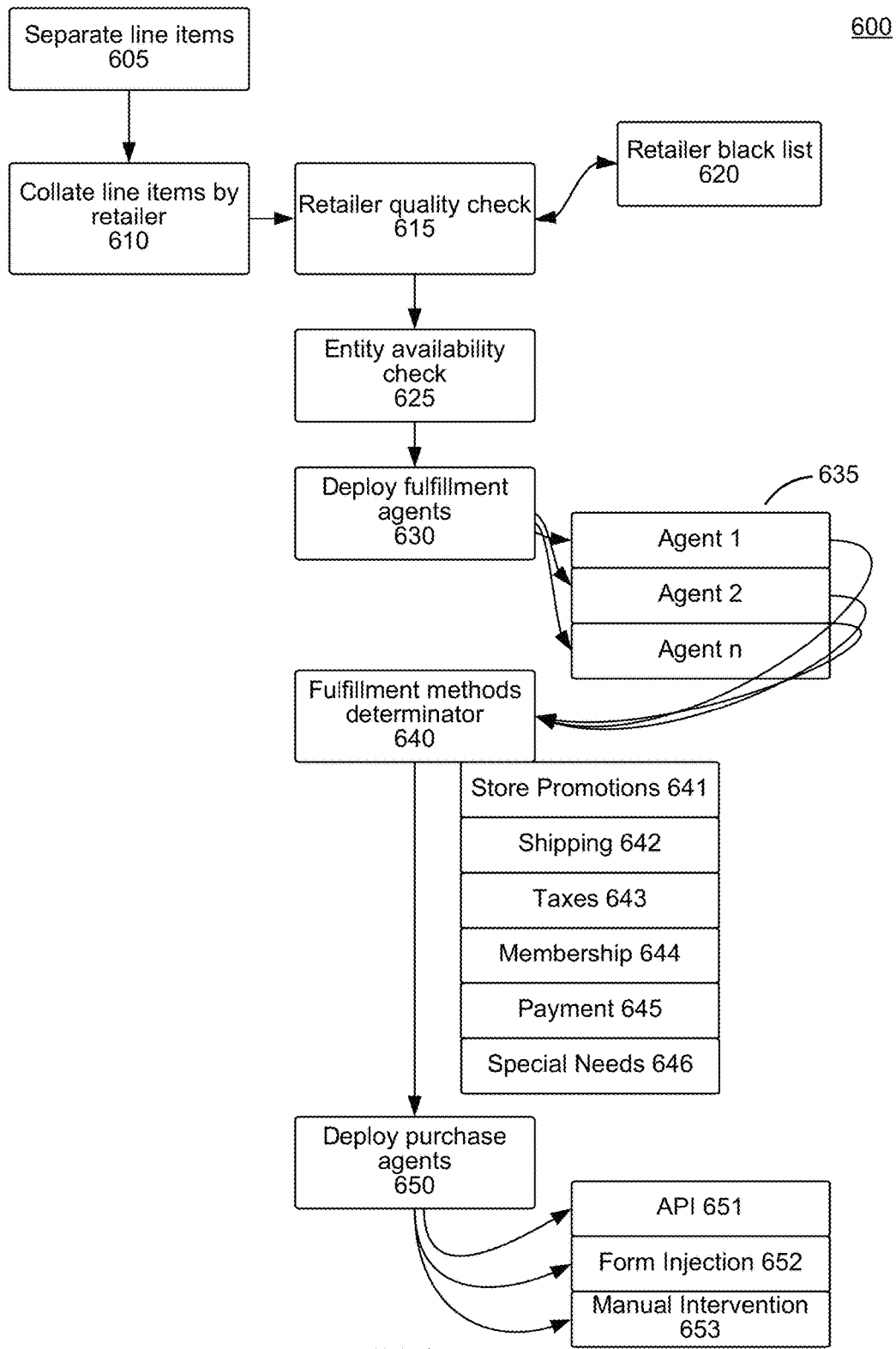
FIG. 6 is a flowchart of an example process for order fulfillment, according to one embodiment.

FIG. 6 is a flowchart of an example process 600 for order fulfillment, according to one embodiment. In response to the server receiving an input to initiate order fulfillment, the server separates 605 various line items of the orders to be fulfilled. If the orders to be fulfilled contain four entities to be purchased, for example, the server separates the overall orders into four line items, where each line item corresponds to each of the four entities to be purchased. The separate line item may include retailer from which the entity can be purchased, which the server can identify from the association table described above with reference to FIG. 4. The server then collates 610 the separated line items by the retailer associated with each line item. By collating the line items by retailers makes it easier for fulfilling the orders by identifying all entities that can be purchased from a retailer when there is more than one entity to be purchased from a retailer. The server checks 615 quality of each retailer from the order line items. Retailer quality check may include validity determination and/or checking 620 whether retailer is part of a black list as described above with reference to FIG. 4. If the server determines that the retailer is part of a black list, the server may provide a notification to the user indicating that the retailer is blacklisted and provides an alternative retailer to the blacklisted retailer, where the alternative retailer is not blacklisted and has an ability to provide the entity associated with the blacklisted retailer.

If the server, on the other hand, determines that the retailer is not part of a black list (i.e., a valid retailer for the transaction), the server checks 625 availability of entity at the respective retailer. The server checks to make sure that the entities to be purchased during order fulfillment are actually available for sale at their respective retailer, similar to the example process for checking entity availability is described above in detail with reference to FIG. 5. Assuming that all entities that are associated with the orders to be fulfilled are actually available (or at least reasonable alternatives are available), the order fulfillment process continues with the server deploying 630 fulfillment agents (e.g., agents 635), which can either be human agents or automated routines for interacting with the retailers to fulfill the orders. In one embodiment, the server deploys a plurality of agents such that a different agent is deployed for each different retailer. Alternatively, one agent can interface with more than one retailer. The automated agents can include web crawlers and the like. An example automated agent performs the web based automated flow that a human agent would follow. For example, the automated flow includes navigating to an entity's web page, adding the entity to a cart, ensuring the entity added to the cart is available in the correct quantity, confirming the in cart price of the entity, initiating the checkout flow and inserting customer information details (e.g., shipping, billing, and payment information) via form injection or other methods, and submitting the order and at the end of this automated flow indicating whether there was a success (order submitted and received by retailer) or failure (exception or other issue that resulted in the order not be verified as submitted).

The deployed agents continue the order fulfillment process by using various fulfillment methods that can relate to one or more of store promotions, shipping, taxes, membership, payment, and any other special needs. The agents may implement the fulfillment methods by use various sub-agents including, but not limited to:

store promotion managers 641 that handle promotions at individual retailers to ensure that the orders are fulfilled after availing of all applicable store promotions;

shipping agents 642 that understand and optimize shipping methods based on the user's and the retailer's preferences;

tax agents 643 that either estimate, calculate, or retrieve detailed tax information for each line item of the orders;

membership agents 644 that manage the user's membership with the retailer such as verifying the user's membership for retailer that require such verification for entity purchase;

payment agents 645 that manage payment methods for each retailer associated with each line item of the orders including interacting with each retailer to determine a payment method (e.g., credit card, cash, wire transfer, and the like) for each order; and any other special needs agents 646 that may be customized as necessary to handle additional criteria for the orders.

After determining the various fulfillment methods for the orders, the server deploys 650 purchase agents to complete the order fulfillment (i.e., complete the e-commerce transactions) for purchasing the entities. In one embodiment, the purchase agents are persons that complete the order fulfillment with manual intervention 653. Alternatively, the purchase agents are automated (i.e., without human involvement) such that the purchase agents complete the order fulfillment using retailer application programming interface (API) and/or form injection 652. An example method of form injection includes an automated process that navigates to a search engine's web page (e.g., www.google.com) and is able to enter certain key words (e.g., "cake recipe") into the search box and press the submit button. The actions of entering a search engine's web page and conducting a web-based search of certain key words are actions typically done by a human but with the form injection process a computer is passing the information into the visible forms and pressing the action button(s) to complete a request or flow.

Referring back to FIG. 3, the server then completes 370 the order fulfillment process. In one embodiment, the server completes the order fulfillment process with the generation of a report (e.g., report 560 of FIG. 5) providing status of the orders fulfilled. The report may include a status of various tasks of the orders being fulfilled such as when the order's entity was verified with the respective retailer, when an actual purchase order was sent to the retailer, what is an estimated time of arrival of the entity for the user, what was the final price of the entity for the fulfilled order, and the like. The generated report may also include detailed pricing estimate for each order. For example, the pricing portion of the report may include price paid per entity; amount paid per retailer; discounts received, if any; taxes paid per entity; shipping costs associated with each entity; membership rewards/points earned per entity, and the like. In some embodiments, the server provides information associated with a status of the order fulfillment of the first and second entities to the user's device for presenting the provided information to the user.

In one embodiment, the status report communicated with the user includes properties associated with the entities being fulfilled. For example, completing order fulfillment of the first and second entities includes communicating properties associated with the first entity with the first retailer and communicating properties associated with the second entity with the second retailer, the properties associated with an entity comprise at least one or more of: user preference for customizing the entity, name of the user, mailing address of the user, billing address of the user, preferred delivery method of the entity, quantity of the entity, and cost of the entity.

In one embodiment, the order fulfillment process includes completing payment transactions for the individual orders. By fulfilling the payment for each order of the multiple orders, the user only has to provide a one-time payment to the third-party for all orders where the third-party is managing the multi-order fulfillment and the third-party (through the server 130) interacts with each retailer to fulfill the individual payments for each order. For example, the order fulfillment process for the first and second entities includes communicating with the first retailer for fulfilling payment associated with the first entity and communicating with the second retailer for fulfilling payment associated with the second entity.

Example Machine Architecture

Figure 7:
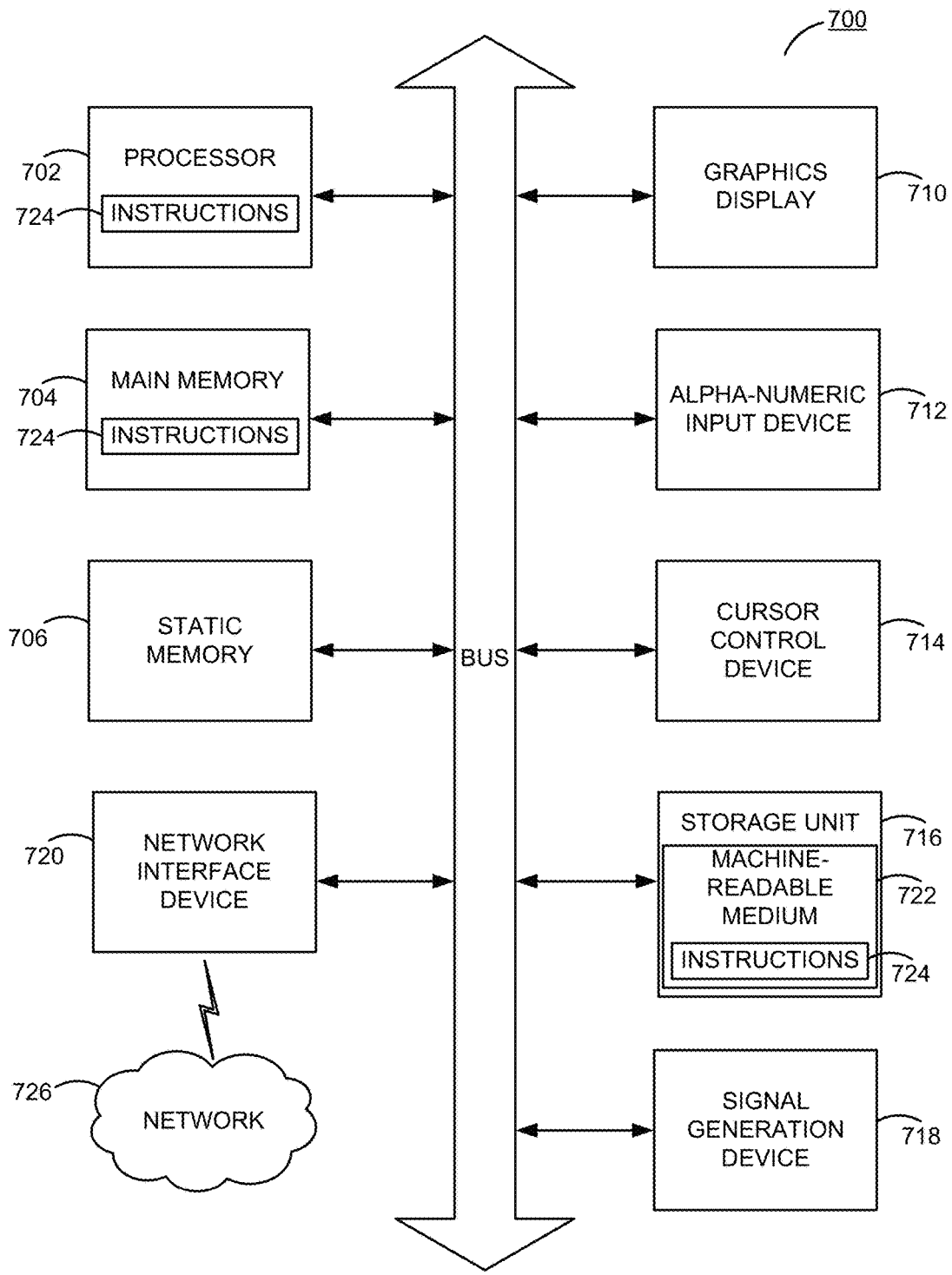
FIG. 7 illustrates components of an example machine that can read instructions from a machine-readable medium and execute them in a processor (or controller), according to one embodiment.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 504 and the storage unit 716 communicate via a bus 708.

In addition, the computer system 700 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Figure 8:
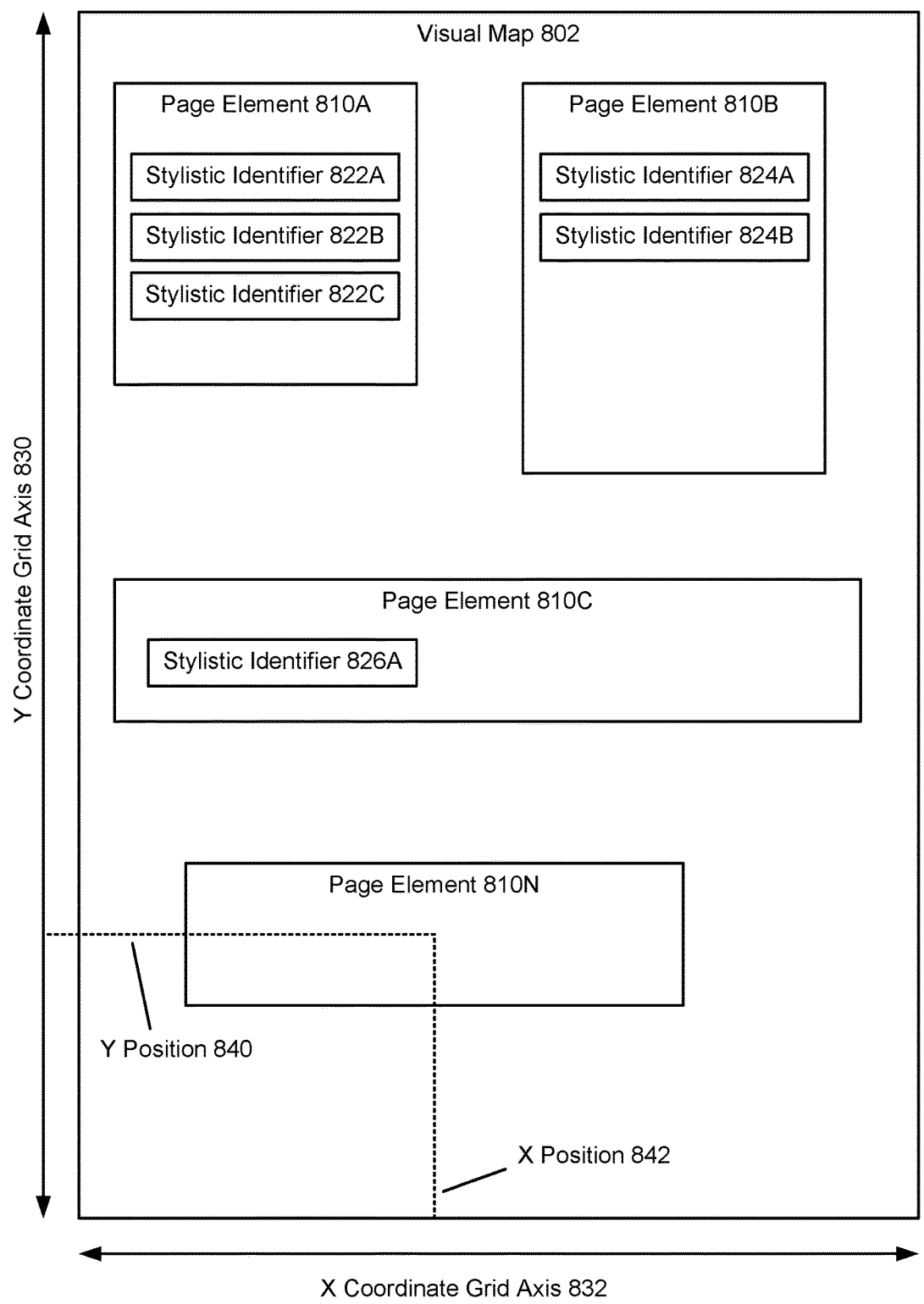
FIG. 8 illustrates an example of a visual map generated by the third party server of FIG. 1, according to one embodiment.

FIG. 8 illustrates an example of a visual map 802 generated by the third party server of FIG. 1, according to one embodiment. As described above, the visual map 802 stores information about various page elements 810A-N, such as JavaScript elements, HTML elements, and so on, of a web page (of a retailer). Each page element 810 may be associated with one or more stylistic identifiers, such as stylistic identifiers 822A-C, stylistic identifiers 824A-B, and stylistic identifiers 826A. Each stylistic identifier indicates relevant information for the page element, such as pricing information, availability information, or other information, which may be extracted from the source code of each element on the web page. In addition, the visual map 802 may be divided into a coordinate system, with a Y coordinate grid axis 830, and an X coordinate grid axis 832. Each page element, such as page element 810N, has a Y position 840 and an X position 842. This coordinate information, along with the stylistic identifiers of each page element, may be used by the stylistic heuristic identifiers to determine the attributes of a page element, i.e., whether it is an entity of interest, whether it indicates an entity for purchase, pricing information for the entity, availability information for the entity, and so on. In other words, a position of an element on the page, as well as its source code elements, may be used to determine what type of entity that page element represents. This may be used to determine, by the third party server, whether that element represents an entity for purchase and whether that entity is the entity matching a purchase request made by a user. If so, the third party server may also deploy one or more agents to determine which element, when interacted with, enables the purchase to occur, and that may fulfill the order using form injection or some other method. The number and position of the page elements shown in FIG. 8 are exemplary and for illustrative purposes only. For any web page, page elements will vary and the stylistic identifiers which are determined for each page element would also vary.

Additional Considerations

The disclosed configurations include a single gesture order fulfillment system that provides several benefits and advantages such as, for example, fulfilling of multiple orders for purchasing entities located on web sites with distinct entity checkout systems with a single gestural input; fulfilling the payment for each order of the multiple orders without user involvement, where the user only provide a one-time payment to the third-party that is managing the multi-order fulfillment and the third-party completes the individual payments for each order being fulfilled; and providing alternate entities/retailers when an entity is not available at a retailer or when a retailer is in a black list.

The order fulfillment process includes generating visual map representations of web pages that include the entities to be purchased, where the visual map representations are a local copy of the web pages that comprises the entities to be purchased. Because the server, in one embodiment, can periodically update the visual map representations automatically, the user need only refer to the visual map representations in her repository for the latest information (e.g., pricing/availability information) of the interested entities. This is even more advantageous for the user when the entities are associated with distinct web pages because the user can rely on her single repository for latest entity information for multiple entities instead of having to visit multiple distinct web pages for such information periodically.

The disclosed configuration of order fulfillment for two or more e-commerce entities located on web pages with distinct product checkout systems only arises in the realm of computer networks and is unique to the Internet. The disclosed configuration efficiently enables the user to be able to purchase different entities located on different e-commerce eco systems with a single shopping cart and also with a single input (e.g., single gestural input). The system is configured to efficiently provide access to information by being configured to generate local copies of a web pages that include the entities being purchased by fulfilling the orders, saving the generated copies in a local repository associated with the user, and periodically refreshing the generated copies of the web page such that the user can refer to the latest refreshed copy of the web pages in her repository instead of accessing the actual web pages. In a scenario where a user is interested to purchase two or more entities located on web pages with distinct product checkout systems, the user is typically interested to find out right away whether the entities of interest are available for purchase. Such a technical problem (i.e., finding out whether two or more entities are available for purchase at their respective web sites and fulfilling purchase of the entities) only arises in the realm of computer networks and is unique to the Internet and doesn't have a counterpart in the brick-and-mortar context.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, agents, or mechanisms, for example, as illustrated in FIGS. 1, 6, and 7. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for multi-site order fulfillment with single gesture through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for order fulfillment, the method comprising:

receiving, at a computer of a third party server over a network, a first indication to purchase a first entity, the first entity offered for purchase on a first electronic commerce web page, the first indication received from a device associated with a user, the first electronic commerce web page provided by a first e-commerce server;

receiving, at the computer, a second indication to purchase a second entity, the second entity offered for purchase on a second electronic commerce web page, the second electronic commerce web page different from and having a distinct entity checkout system than the first electronic commerce web page, the second indication received from the device, the second electronic commerce web page provided by a second e-commerce server;

transmitting a first request over the network to the first e-commerce server for the first electronic commerce web page;

transmitting a second request over the network to the second e-commerce server for the second electronic commerce web page;

extracting, by the computer, first information associated with the first entity from the first electronic commerce web page and second information associated with the second entity from the second electronic commerce web page, the first and second information added to an electronic shopping cart associated with the user, wherein the extracting of information from a web page for an entity is performed by:

extracting source code for the web page;

extracting one or more elements from the source code;

generating, by the computer, a visual map of the web page using the extracted one or more elements of source code, the visual map indicating a position of each of the one or more elements on the web page; and identifying, using stylistic heuristics, attributes of the entity by analyzing the one or more elements based on information in the visual map;

receiving, at the computer, an input to initiate order fulfillment for the first and second entities;

determining whether the first entity is available for purchase at a first retailer associated with the first electronic commerce web page, and whether the second entity is available for purchase at a second retailer associated with the second electronic commerce web page;

executing, in response to determining that each of the first and second entities is available for purchase, order fulfillment for the first and second entities, the order fulfillment including attributes of the first and second entities, the order fulfillment performed using form injection at web pages of the first retailer and the second retailer; and completing order fulfillment of the first and second entities by interacting with the first and second retailers based on the attributes of the first and second entities.

2. The computer-implemented method of claim 1, further comprising:

determining whether the first retailer or the second retailer is a blacklisted retailer, the determination comprises evaluating multiple attributes of the retailer, wherein blacklisting a retailer indicates a lack of trustworthiness of the retailer.

3. The computer-implemented method of claim 2, wherein the multiple attributes of the retailer include at least one or more of: popularity of the retailer, quality of merchandise sold by the retailer, location associated with the retailer, domain name of the retailer, media content associated with a web page of the retailer, type of currency used for entity pricing information, shipping policy, return policy, and availability of customer support options.

4. The computer-implemented method of claim 2, further comprising:

providing a notification, upon determining that the first retailer or the second retailer is blacklisted, to the user indicating that the retailer is blacklisted and providing an alternate retailer to the blacklisted first or second retailer, the alternate retailer is not blacklisted and has an ability to provide the first or second entity associated with the blacklisted retailer.

5. The computer-implemented method of claim 1, wherein the extracted first information and second information is stored in a repository associated with the user.

6. The computer-implemented method of claim 1, wherein checking whether the first and the second entities are available for purchase is either fully or partially automated, the checking comprises launching one or more web crawlers for verifying whether the first and the second entities are available for purchase at the first and second web pages respectively.

7. The computer-implemented method of claim 6, further comprising:

providing, upon determining that the first entity is unavailable for purchase at the first retailer or that the second entity is unavailable for purchase at the second retailer, a recommendation to purchase a third entity alternate to the unavailable entity, the third entity available for purchase at either the first retailer or the second retailer.

8. The computer-implemented method of claim 6, further comprising:

providing, upon determining that the first entity is unavailable for purchase at the first retailer or that the second entity is unavailable for purchase at the second retailer, a recommendation for purchasing the unavailable first entity or the unavailable second entity at an alternate retailer, the first entity or the second entity is available for purchase at the alternate retailer.

9. The computer-implemented method of claim 1, wherein a third-party managing the order fulfillment for the first entity and the second entity lacks an apriori relationship with the first retailer and the second retailer.

10. The computer-implemented method of claim 1, wherein each of the first entity and the second entity represents at least one of: an entity without physical manifestation, an entity downloadable from a network, an entity representing a subscription service, and an entity representing a digital gift.

11. The computer-implemented method of claim 1, wherein the first indication to purchase the first entity is received at the computer from a first device and the second indication to purchase the second entity is received at the computer from a second device, the second device different from the first device, each of the first and second devices is either a mobile device or a desktop-based device.

12. The computer-implemented method of claim 1, wherein completing order fulfillment of the first and second entities comprises communicating properties associated with the first entity with the first retailer and communicating properties associated with the second entity with the second retailer, the properties associated with an entity comprise at least one or more of: user preference for customizing the entity, name of the user, mailing address of the user, billing address of the user, and preferred delivery method.

13. The computer-implemented method of claim 1, wherein completing order fulfillment of the first and second entities comprises communicating with the first retailer for fulfilling payment associated with the first entity and communicating with the second retailer for fulfilling payment associated with the second entity.

14. The computer-implemented method of claim 1, further comprising:
   providing information associated with a status of the order fulfillment of the first and second entities to the device for presenting the provided information to the user.

15. The computer-implemented method of claim 1, wherein the received input initiating the order fulfillment for the first and second entities is either a single gesture or a single voice command associated with the device, the user provides the single gesture or the single voice command.

16. The computer-implemented method of claim 1, wherein at least one of checking whether the first and second entities are available for purchase at the first and second retailers respectively, launching order fulfillment for the first and second entities, and completing order fulfillment of the first and second entities comprises human intervention.

17. The computer-implemented method of claim 1, wherein the device comprises at least one of: mobile device, smartphone, phablet, tablet computer, desktop computer, laptop computer, and game controller.

18. The computer-implemented method of claim 1, wherein checking whether each of the first and second entities is available for purchase at the first and second retailers respectively comprises generating a response code indicating the availability status for the entity, and launching order fulfillment for each of the first and second entities comprises launching code, the launching code is based on the generated response code indicating the availability of the entity.

19. A system for order fulfillment, the system comprising:
   a network;
   a first e-commerce server configured to provide web pages;
   a second e-commerce server configured to provide web pages;
   a third party server coupled to the first e-commerce server and the second e-commerce server via the network, the third party server configured to:
      receive a first indication to purchase a first entity, the first entity offered for purchase on a first electronic commerce web page, the first indication received from a device associated with a user, the first electronic commerce web page provided by the first e-commerce server;
      receive a second indication to purchase a second entity, the second entity offered for purchase on a second electronic commerce web page, the second electronic commerce web page different from and having a distinct entity checkout system than the first electronic commerce web page, the second indication received from the device, the second electronic commerce web page provided by a second e-commerce server;
      transmit a first request over the network to the first e-commerce server for the first electronic commerce web page;
      transmit a second request over the network to the second e-commerce server for the second electronic commerce web page;
      extract first information associated with the first entity from the first electronic commerce web page and second information associated with the second entity from the second electronic commerce web page, the first and second information added to a shopping cart associated with the user, wherein the extraction of information from a web page for an entity is performed by:
         extracting source code for the web page;
         extracting one or more elements from the source code;
         generating a visual map of the web page using the extracted one or more elements of source code, the visual map indicating a position of each of the one or more elements on the web page; and
         identifying, using stylistic heuristics, attributes of the entity by analyzing the one or more elements based on information in the visual map;
      receive an input to initiate order fulfillment for the first and second entities;
      determine whether the first entity is available for purchase at a first retailer associated with the first electronic commerce web page, and whether the second entity is available for purchase at a second retailer associated with the second electronic commerce web page;
      execute, in response to the determination that each of the first and second entities is available for purchase, order fulfillment for the first and second entities, the order fulfillment including attributes of the first and second entities, the order fulfillment performed using form injection at web pages of the first retailer and the second retailer; and
      complete order fulfillment of the first and second entities by interacting with the first and second retailers based on the attributes of the first and second entities.

20. A non-transitory computer-readable medium configured to store instructions, the instructions when executed by a processor cause the processor to:
   receive, at a computer of a third party server over a network, a first indication to purchase a first entity, the first entity offered for purchase on a first electronic commerce web page, the first indication received from a device associated with a user, the first electronic commerce web page provided by a first e-commerce server;
   receive, at the computer, a second indication to purchase a second entity, the second entity offered for purchase on a second electronic commerce web page, the second electronic commerce web page different from and having a distinct entity checkout system than the first electronic commerce web page, the second indication received from the device, the second electronic commerce web page provided by a second e-commerce server;
   transmit a first request over the network to the first e-commerce server for the first electronic commerce web page;
   transmit a second request over the network to the second e-commerce server for the second electronic commerce web page;
   extract, by the computer, first information associated with the first entity from the first electronic commerce web page and second information associated with the second entity from the second electronic commerce web page, the first and second information added to a shopping cart associated with the user, wherein the extraction of information from a web page for an entity is performed by:

extracting source code for the web page;

extracting one or more elements from the source code;

generating a visual map of the web page using the extracted one or more elements of source code, the visual map indicating a position of each of the one or more elements on the web page; and identifying, using stylistic heuristics, attributes of the entity by analyzing the one or more elements based on information in the visual map;

receive, at the computer, an input to initiate order fulfillment for the first and second entities;

determine whether the first entity is available for purchase at a first retailer associated with the first commerce web page, and whether the second entity is available for purchase at a second retailer associated with the second commerce web page;

execute, in response to the determination that each of the first and second entities is available for purchase, order fulfillment for the first and second entities, the order fulfillment including attributes of the first and second entities, the order fulfillment performed using form injection at web pages of the first retailer and the second retailer; and complete order fulfillment of the first and second entities by interacting with the first and second retailers based on the attributes of the first and second entities.

* * * * *